US008423083B1

(12) United States Patent
Bledsoe et al.

(10) Patent No.: US 8,423,083 B1
(45) Date of Patent: *Apr. 16, 2013

(54) HANDHELD SCANNING DEVICE

(75) Inventors: James Bledsoe, Corvallis, OR (US);
Asher Simmons, Corvallis, OR (US);
Patrick McKinley, Corvallis, OR (US);
Gregory Carlson, Corvalis, OR (US);
Todd McClelland, Corvallis, OR (US);
James Mealy, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,104

(22) Filed: Jul. 23, 2012

Related U.S. Application Data

(63) Continuation of application No. 13/113,248, filed on May 23, 2011, now Pat. No. 8,229,503, which is a continuation of application No. 11/955,228, filed on Dec. 12, 2007, now Pat. No. 7,949,370.

(60) Provisional application No. 60/892,688, filed on Mar. 2, 2007, provisional application No. 60/892,707, filed on Mar. 2, 2007, provisional application No. 60/883,217, filed on Jan. 3, 2007.

(51) Int. Cl.
*H04M 1/00* (2006.01)
*H04W 88/02* (2009.01)

(52) U.S. Cl.
USPC ............ 455/556.1; 455/550.1; 455/557; 455/90.1

(58) Field of Classification Search .............. 455/556.1, 455/550.1, 557, 90.1, 517, 556.2, 558, 90.3, 455/566; 358/1.18, 1.15, 450, 448, 473, 358/449; 382/107, 113, 141, 112, 238
See application file for complete search history.

(56) References Cited

U.S. PATENT DOCUMENTS

| | | | |
|---|---|---|---|
| 5,278,582 A | 1/1994 | Hongo | |
| 5,461,680 A | 10/1995 | Davis | |
| 5,578,813 A | 11/1996 | Allen et al. | |
| 5,927,872 A | 7/1999 | Yamada | |
| 5,930,466 A | 7/1999 | Rademacher | |
| 5,988,900 A | 11/1999 | Bobry | |
| 6,348,978 B1 | 2/2002 | Blumer et al. | |

(Continued)

FOREIGN PATENT DOCUMENTS

EP 1209574 A2 5/2002

OTHER PUBLICATIONS

Fairchild, "IEEE 1284 Interface Design Solutions", Jul. 1999, Fairchild Semiconductor, AN-5010, 10 pages.

(Continued)

*Primary Examiner* — John J Lee

(57) ABSTRACT

Systems, apparatuses, and methods for a scanning device for use with a mobile device are described herein. The scanning device may include an image capture module to capture surface images of a medium to be scanned and a positioning module to determine positioning information based at least in part on navigational images and the captured surface images. A mobile device may include one or more features of the scanning device including the image capture module and the positioning module. Other embodiments may be described and claimed.

20 Claims, 7 Drawing Sheets

U.S. PATENT DOCUMENTS

| | | | |
|---|---|---|---|
| 6,384,921 | B1 | 5/2002 | Saijo et al. |
| 7,200,560 | B2 | 4/2007 | Philbert |
| 7,297,912 | B1 | 11/2007 | Todoroff et al. |
| 7,336,388 | B2 * | 2/2008 | Breton .................. 358/1.18 |
| 7,410,100 | B2 | 8/2008 | Muramatsu |
| 7,607,749 | B2 | 10/2009 | Tabata et al. |
| 7,929,019 | B2 | 4/2011 | Ohmura et al. |
| 7,988,251 | B2 | 8/2011 | Dimitrijevic et al. |
| 2002/0154186 | A1 | 10/2002 | Matsumoto |
| 2002/0158955 | A1 | 10/2002 | Hess et al. |
| 2003/0150917 | A1 | 8/2003 | Tsikos et al. |
| 2004/0021912 | A1 | 2/2004 | Tecu et al. |
| 2004/0183913 | A1 * | 9/2004 | Russell .................. 348/207.2 |
| 2004/0208346 | A1 | 10/2004 | Baharav et al. |
| 2006/0061647 | A1 | 3/2006 | Breton |
| 2008/0144053 | A1 * | 6/2008 | Gudan et al. .................. 358/1.8 |
| 2008/0204770 | A1 | 8/2008 | Bledsoe et al. |
| 2008/0212120 | A1 | 9/2008 | Mealy et al. |
| 2009/0034018 | A1 | 2/2009 | Lapstun et al. |
| 2009/0279148 | A1 | 11/2009 | Lapstun et al. |
| 2010/0039669 | A1 | 2/2010 | Chang et al. |
| 2010/0231633 | A1 | 9/2010 | Lapstun et al. |

OTHER PUBLICATIONS

Texas Instruments, "Program and Data Memory Controller", Sep. 2004, SPRU577A, 115 pages.

* cited by examiner

HANDHELD SCANNING DEVICE

CROSS-REFERENCE TO RELATED APPLICATIONS

This Application is a continuation of and claims priority to U.S. application Ser. No. 13/113,248, filed May 23, 2011 (U.S. Pat. No. 8,229,503), which is a continuation of U.S. application Ser. No. 11/955,228 (U.S. Pat. No. 7,949,370), filed Dec. 12, 2007, which claims priority under 35 U.S.C. §119(e) to U.S. Provisional Application Nos. 60/883,217, filed Jan. 3, 2007; 60/892,688 filed Mar. 2, 2007; and 60/892,707 filed Mar. 2, 2007. The disclosures of the applications referenced above are incorporated herein by reference.

TECHNICAL FIELD

Embodiments of the present invention relate to the field of image translation and, in particular, to a scanning device for mobile devices.

BACKGROUND

Mobile telephones have achieved tremendous popularity among consumers. Many, if not most, consumers own at least one mobile telephone, some of those consumers replacing the traditional landline completely therewith. As such, improvements in capability and functionality of these devices have been met with eager approval. For example, these devices commonly include the most advanced display and image processing technologies as well as text messaging and photographing capabilities.

Despite the many advances in mobile phone technology, capturing images on a medium such as paper, for example, onto a mobile phone for storing, e-mailing, faxing, etc., has not been satisfactorily achieved. Even those solutions that currently exist generally are not available to the consumer in a manner that matches the mobility of mobile telephone devices. Current desktop scanning solutions may be impractical or undesirable options for those consumers who want high-quality scanning on the fly.

SUMMARY

In view of the challenges in the state of the art, at least some embodiments of the present invention are based on the technical problem of providing a scanning device for use with a mobile device that may accurately determine position of the scanning device and/or the mobile device over an entire scan operation. More specifically, there is provided, in accordance with various embodiments of the present invention, a scanning device including one or more navigation sensors configured to capture first navigational measurements of a first portion of a medium; one or more optical imaging sensors configured to capture a first plurality of surface images of the first portion of the medium; a control block configured to construct a composite image based at least in part on the first plurality of surface images and to determine a position of the apparatus relative to a first reference point based at least in part on the first navigational measurements; and a communication interface configured to provide the composite image to a mobile device.

In some embodiments, the control block may include a positioning module configured to control the one or more navigation sensors and to determine the position of the scanning device relative to the first reference point based at least in part on the first navigational measurements.

In some embodiments, the control block may be configured to control the one or more navigation sensors to capture second navigational measurements of a second portion of the medium, and to determine a plurality of positions of the scanning device relative to a second reference point based at least in part on the second navigational measurements.

In some embodiments, the control block may be configured to control the one or more optical imaging sensors to capture a second plurality of surface images of the second portion of the medium and to construct the composite image based at least in part on the determined plurality of positions of the scanning device and the second plurality of surface images.

In various embodiments, the control block may include an image processing module configured to process the composite image in a manner to facilitate transmission of the composite image to the mobile device.

In some embodiments, the apparatus may include an image capture module configured to control the one or more optical imaging sensors to capture a plurality of surface images of the medium.

In some embodiments, the communication interface may comprise a wireless communication interface. In various embodiments, the scanning device may be configured to couple to the mobile device.

There is also provided, in accordance with various embodiments of the present invention, a mobile device that may include a communication interface configured to receive image data from a scanning device; a positioning module configured to control one or more navigation sensors of the scanning device to capture first navigational measurements of a first portion of a medium and to determine a position of the scanning device relative to a first reference point based at least in part on the first navigational measurements; and an image capture module configured to control one or more optical imaging sensors of the scanning device to capture a first plurality of surface images of the first portion of the medium and to construct a composite image based at least in part on the determined position of the scanning device and the first plurality of surface images.

In some embodiments, the positioning module may be configured to control the one or more navigation sensors to capture second navigational measurements of a second portion of the medium, and to determine a plurality of positions of the scanning device relative to a second reference point based at least in part on the second navigational measurements.

In some embodiments, the image capture module may be configured to control the one or more optical imaging sensors to capture a second plurality of surface images of the second portion of the medium and to construct the composite image based at least in part on the determined plurality of positions of the scanning device and the second plurality of surface images.

In some embodiments, the image capture module may be configured to transmit the composite image to a remote device. In various embodiments, the image capture module may be configured to transmit the composite image to the remote device by a selected one of e-mail, fax, and file transfer protocol. In some embodiments, the mobile device may include an image processing module configured to process the composite image in a manner to facilitate transmission of the composite image to the remote device.

In some embodiments, the communication interface may comprise a wireless communication interface. In various embodiments, the mobile device may be configured to couple to the scanning device.

A method is also provided in accordance with various embodiments. The method may include controlling one or more navigation sensors to capture first navigational measurements of a first portion of a medium; determining a position of a scanning device relative to a first reference point based at least in part on the first navigational measurements; controlling one or more optical image sensors to capture a first plurality of surface images of the first portion of the medium; and constructing a composite image based at least in part on the determined position of the scanning device and the first plurality of surface images.

In various embodiments, the method may comprise transmitting the composite image to a mobile device. In some embodiments, the method may include processing the composite image in a manner to facilitate the transmission of the composite image to the mobile device.

In some embodiments, the method may include controlling the one or more navigation sensors to capture second navigational measurements of a second portion of the medium; determining a plurality of positions of the scanning device relative to a second reference point based at least in part on the second navigational measurements; controlling the one or more optical image sensors to capture a second plurality of surface images of the second portion of the medium; and wherein the construction of the composite image is based at least in part on the determined plurality of positions and the second plurality of surface images.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Mobile devices as described herein may include various handheld devices and the like. For example, a mobile device may include, but is not limited to, a mobile telephone, a personal digital assistant, or a smartphone. Although embodiments described herein may particularly refer to a mobile telephone, it is contemplated that embodiments of the present disclosure may be equally applicable to other mobile devices.

Figure 1:
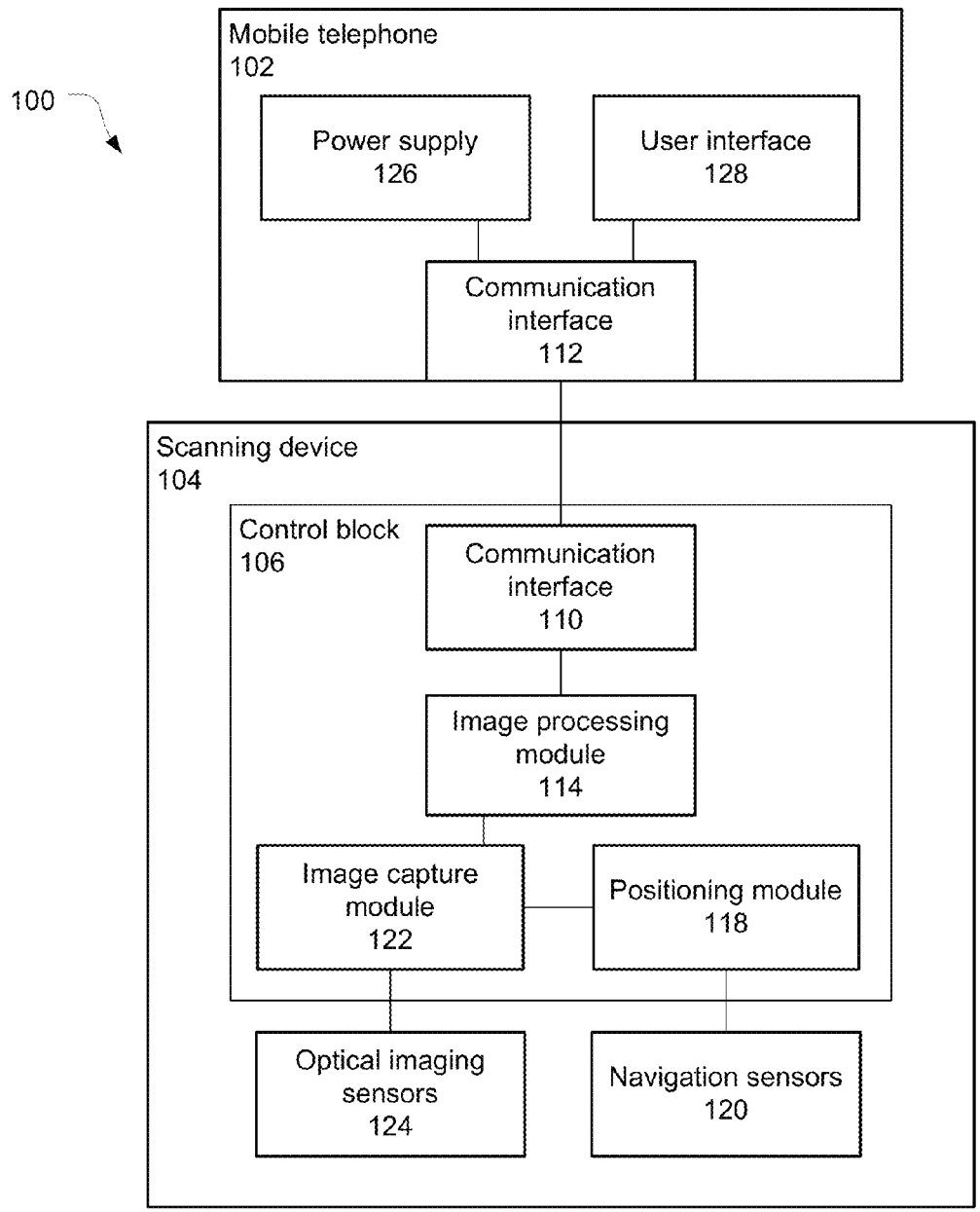
FIG. 1 is a schematic of a system including a mobile telephone and a scanning device in accordance with various embodiments of the present invention.

FIG. 1 is a schematic of a system 100 including a mobile device, such as, for example, a mobile telephone 102, and further including a scanning device 104 in accordance with various embodiments of the present invention. The scanning device 104 may include a control block 106 with components designed to control one or more navigation sensors 120 in a manner to facilitate precise and accurate positioning of the data obtained by the optical imaging sensors 124 throughout an entire scanning operation. This positioning may allow for reliable image acquisition, through scanning, in a truly mobile and versatile platform as will be explained herein.

The control block 106 may include a communication interface 110 configured to communicatively couple the control block 106 to a communication interface 112 of the mobile telephone 102. In various embodiments, the scanning device 104 may be configured to transmit data related to a scanned image to the mobile telephone 102, and the mobile telephone 102 may be configured to transmit information related to a scanning operation (to a remote device or another device, for example).

The communication interface 110 may include a wireless transceiver to allow the communicative coupling with the mobile telephone 102 to take place over a wireless link. The image data may be wirelessly transmitted over the link through the modulation of electromagnetic waves with frequencies in the radio, infrared or microwave spectrums.

A wireless link may contribute to the mobility and versatility of the scanning device 104. However, some embodiments may additionally/alternatively include a wired link communicatively coupling the mobile telephone 102 to the communication interface 110.

In some embodiments, the communication interface 110 may communicate with the mobile telephone 102 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The control block 106 may also include an image capture module 122. The image capture module 122 may be communicatively coupled to the one or more optical imaging sensors 124. The optical imaging sensors 124 may include a number of individual sensor elements. The optical imaging sensors 124 may be designed to capture a plurality of surface images of the tangible medium, which may be individually referred to as component surface images. The image capture module 122 may generate a composite image by stitching together the component surface images. The image capture module 122 may receive positioning information from the positioning module 118 to facilitate the arrangement of the component surface images into the composite image.

In an embodiment in which the scanning device 104 is capable of scanning full color images, the optical imaging sensors 124 may have the sensors elements designed to scan different colors.

Scanned image data may be transmitted to an on-board image processing module 114. As illustrated, the image processing module 114 is located on the scanning device 104. In other embodiments, however, the image processing module 114, at least in part, may be located on the mobile telephone 102 and such a configuration may minimize the overall size and/or expense of the scanning device 104.

The image processing module 114 may also receive positioning information, indicative of a position of the optical imaging sensors 124 relative to a reference point, from a positioning module 118. The positioning module 118 may be communicatively coupled to one or more navigation sensors 120. The navigation sensors 120 may include a light source, e.g., LED, a laser, etc., and an optoelectronic sensor designed to take a series of pictures of a medium to be scanned located adjacent to the scanning device 104 as the scanning device 104 is moved over the medium. The positioning module 118 may process the pictures provided by the navigation sensors 120 to detect structural variations of the medium. The movement of the structural variations in successive pictures may indicate motion of the scanning device 104 relative to the medium. Tracking this relative movement may facilitate determination of the precise positioning of the data from the optical imaging sensors 124. The navigation sensors 120 may be maintained in a structurally rigid relationship with the optical imaging sensors 124, thereby allowing for the calculation of the precise location of the optical imaging sensor data at any point in time during the scanning process.

The image processing module 114 may be configured to process a composite image in a manner to facilitate transmitting and/or storing of the composite image to the mobile telephone and/or another device. The composite image may be one generated by the image capture module 122 by stitching together the component surface images.

A composite image acquired by the scanning device 104 may be subsequently transmitted to the mobile telephone 102 and/or one or more of the other devices by, e.g., e-mail, fax, file transfer protocols, etc. The composite image may be additionally/alternatively stored locally by the scanning device 104 for subsequent review, transmittal, printing, etc.

The navigation sensors 120 may have operating characteristics sufficient to track movement of the scanning device 104 with the desired degree of precision. In an exemplary embodiment, the navigation sensors 120 may process approximately 2000 frames per second, with each frame including a rectangular array of 18×18 pixels. Each pixel may detect a six-bit grayscale value, e.g., capable of sensing 64 different levels of gray.

Once the image capture module 122 receives the positioning information it may coordinate the location of the optical imaging sensors 124 to a portion of the processed image with a corresponding location. The image capture module 122 may then control the optical imaging sensors 124 in a manner to scan the medium having an image thereon.

The scanning device 104 may include its own dedicated power supply (not illustrated) and/or may receive power from a power supply 126 of the mobile telephone 102. The power supply of the scanning device 104 and/or the power supply 126 of the mobile telephone 102 may be a mobile power supply, e.g., a battery, a rechargeable battery, a solar power source, etc. In other embodiments, the power supply of the scanning device 104 and/or the power supply 126 of the mobile telephone 102 may additionally/alternatively regulate power provided by another component (e.g., another device, a power cord coupled to an alternating current (AC) outlet, etc.).

The mobile telephone 102 may include a user interface 128, as is generally present on known mobile telephones. The user interface 128 may include keys or similar features for inputting numbers and/or letters, adjusting volume and screen brightness, etc. Advantageously, the user interface 128 may also be configured to control one or more aspects of a scanning operation by the scanning device 104. For example, the user interface 128 may allow a user to start and/or stop the scanning operation, repeat the scanning operation, adjust the scanning operation, etc. In other embodiments, however, the scanning device 104 may include its own dedicated user interface (not illustrated).

Figure 2:
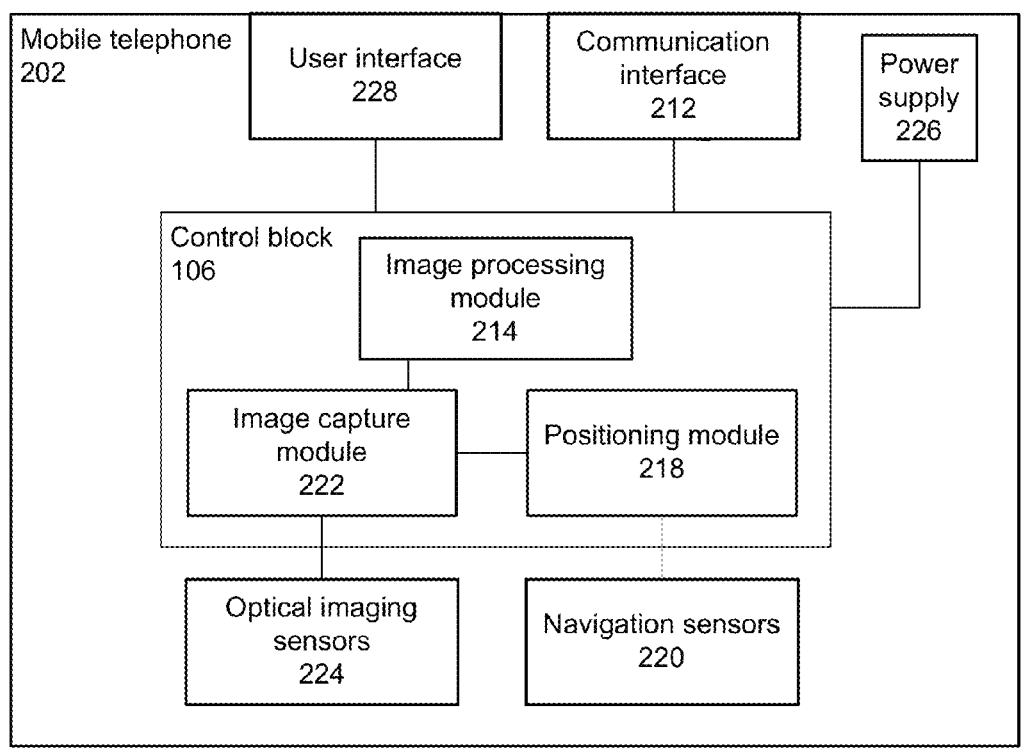
FIG. 2 is a schematic of another system including a mobile telephone and a scanning device in accordance with various embodiments of the present invention.

The mobile telephone 102 and the scanning device 104 may be physically coupled, at least temporarily. In these embodiments, the housings of the mobile telephone 102 and the scanning device 104 may be configured to interlock or snap together such that a user may attach the scanning device 104 to the mobile telephone when a scanning operation is desired yet decouple them when not needed. For example, the communication interface 110 of the scanning device 104 may comprise a port to receive the mobile telephone 102, or may instead comprise an interface for docking into a port of the mobile telephone 102. In other embodiments, however, the scanning device 104 and the mobile telephone 102 may be fully integrated. As illustrated in FIG. 2, for example, a mobile telephone 202 may include a user interface 228, a communication interface 212, a power supply 226, a control block 206, one or more optical imaging sensors 224, and one or more navigation sensors 220. The control block 206 may include an image processing module 214, an image capture module 222, and a positioning module 218.

Figure 3:
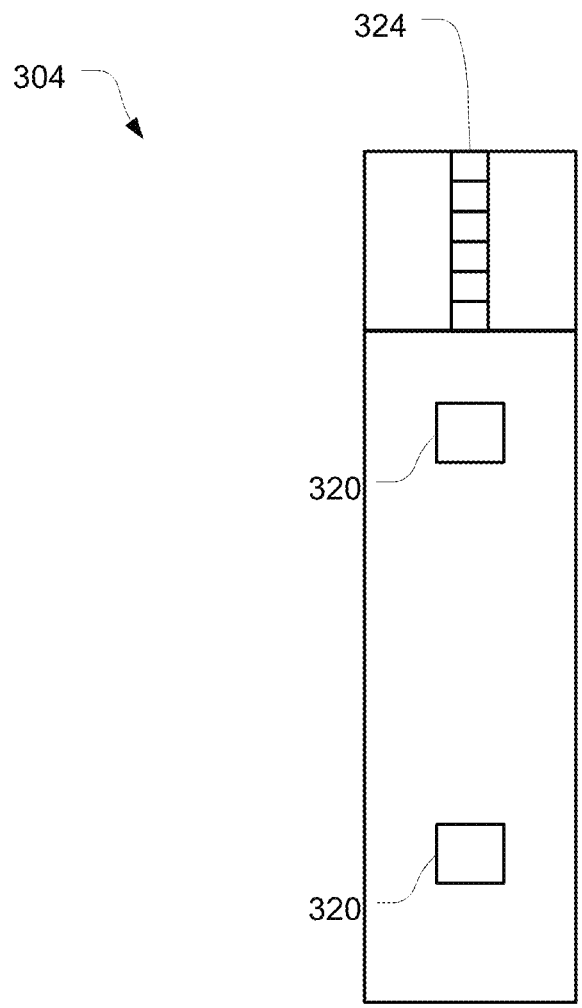
FIG. 3 is a bottom plan view of a scanning device in accordance with various embodiments of the present invention.

FIG. 3 is a bottom plan view of a scanning device 304 in accordance with various embodiments of the present invention. The scanning device 304, which may be substantially interchangeable with scanning device 104, may have a pair of navigation sensors 320 and optical imaging sensors 324.

The pair of navigation sensors 320 may be used by a positioning module to determine positioning information related to the optical imaging sensors 324. As stated above, the proximal relationship of the optical imaging sensors 324 to the navigation sensors 320 may be fixed to facilitate the positioning of the data obtained from the optical imaging sensors 324 through information obtained by the navigation sensors 320.

Figure 4:
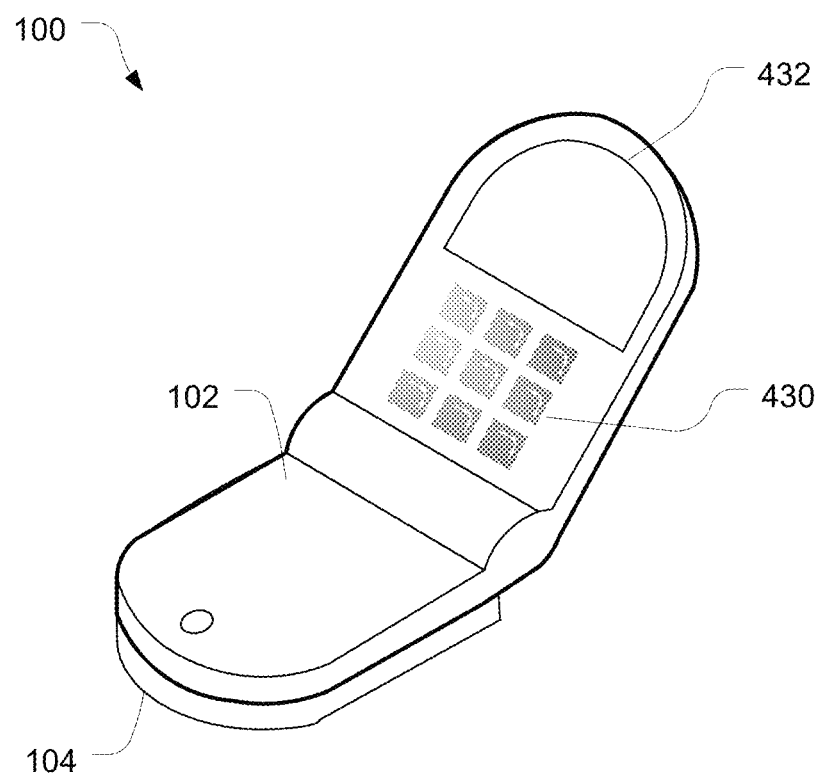
FIG. 4 illustrates a mobile telephone including a scanning device in accordance with various embodiments of the present invention.

FIG. 4 illustrates another view of the scanning system 100 in accordance with various embodiments of the present invention. As illustrated, the scanning device 104 couples to the mobile telephone 102 such that a user may manipulate the scanning device 104 by moving the system 100 across a medium to be scanned. The mobile telephone 102 may include a user interface to allow for inputs/outputs to provide the functionality enabled through use of the scanning device 104. Some examples of inputs/outputs that may be used to provide some of the basic functions of the scanning device 104 include, but are not limited to, one or more keys 430 or similar features for controlling initiate/resume of a scan operation and a display 432.

The display 432, which may be a passive display, an interactive display, etc., may provide the user with a variety of information. The information may relate to the current operating status of the scanning device 104 (e.g., scanning, ready to scan, etc.), power of the battery, errors (e.g., scanning/positioning error, etc.), instructions (e.g., "position device over a portion of the image to be scanned for reorientation," etc.). If the display 432 is an interactive display it may provide a control interface in addition to, or as an alternative from, the keys 430.

Figure 5:
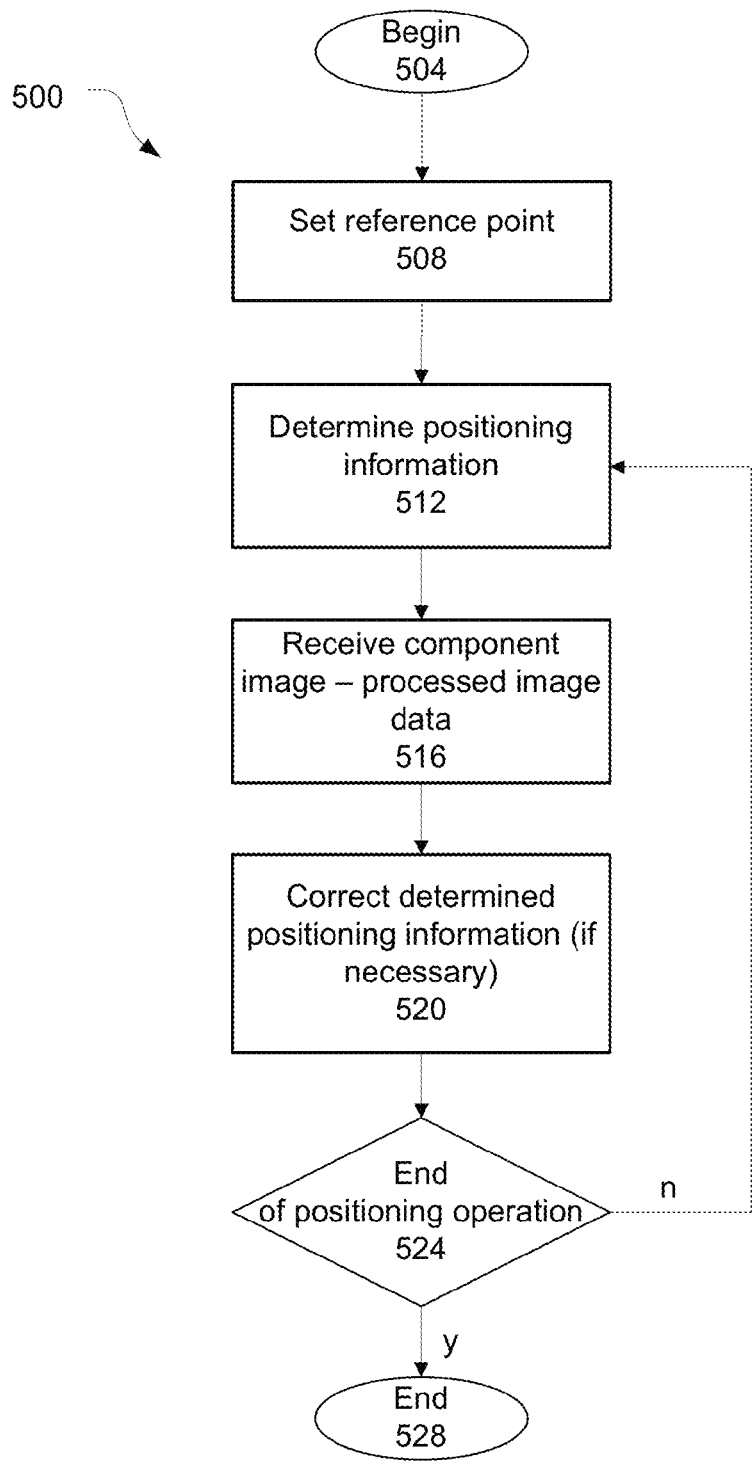
FIG. 5 is a flow diagram depicting a positioning operation of a scanning device in accordance with various embodiments of the present invention.

FIG. 5 is a flow diagram 500 depicting a positioning operation of a scanning device (such as 104 or 304, for example) or of a mobile telephone (such as 202, for example) in accordance with various embodiments of the present invention. A positioning operation may begin in block 504 with an initiation of a scanning operation. A positioning module within the scanning device may set a reference point in block 508. The reference point may be set when the scanning device is placed onto a medium at the beginning of a scan job. This may be ensured by the user entering some input (by way of a user interface 128 or 228, for example) once the scanning device is in place and/or by the proper placement of the scanning device being treated as a condition precedent to instituting the positioning operation. In some embodiments, the proper placement of the scanning device may be automatically determined through the navigation sensors (120, 220, or 320, for example), the optical imaging sensors (124, 224, or 324, for example), and/or some other sensors (e.g., a proximity sensor).

Once the reference point is set in block 508, the positioning module may determine positioning information, e.g., translational and/or rotational changes from the reference point, using the navigation sensors in block 512. Positioning information may be transmitted (to a positioning module, for example). The translational changes may be determined by tracking incremental changes of the positions of the navigation sensors along a two-dimensional coordinate system, e.g., $\Delta x$ and $\Delta y$. Rotational changes may be determined by tracking incremental changes in the angle of the scanning device, e.g., $\Delta \Theta$, with respect to, e.g., the y-axis. These transitional and/or rotational changes may be determined by the positioning module comparing consecutive navigational measurements taken by the navigation sensors to detect these movements.

The positioning module may also receive component surface images from the optical imaging sensors and processed image data from the image processing module in block 516. If the positioning information is accurate, a particular component surface image from a given location should match a corresponding portion of the processed image. If the given location is one for which the optical imaging sensors have captured less than all component surface images, any component surface images available may be compared to the processed image for determining the position of the scanning device. In the event that the optical imaging sensors have yet to capture any component surface images, the positioning information may not be verified through this method. However, the verification of the positioning information may be done frequently enough given the constant movement of the scanning device and the physical arrangement of the optical imaging sensors.

If the particular component surface image from the given location does not match the corresponding portion of the processed image the positioning module may correct the determined positioning information in block 520. Given adequate information, e.g., sufficient amount of captured component surface images in the location, the positioning module may set the positioning information to the offset of the portion of the processed image that matches the component surface image. In most cases this may be an identified pattern in close proximity to the location identified by the incorrect positioning information. In the event that the pattern captured by the component surface image does not identify a pattern unique to the region surrounding the incorrect positioning information, multiple component surface images may be combined in an attempt to identify a unique pattern. Alternatively, correction may be postponed until a component surface image is captured that does identify a pattern unique to the surrounding region.

In some embodiments, the correction of the determined positioning information in block 520 may be done periodically in order to avoid overburdening the computational resources of the positioning module.

Following correction in block 520, the positioning module may determine whether the positioning operation is complete in block 524. If it is determined that the positioning operation is not yet complete, the operation may loop back to block 512. If it is determined that it is the end of the positioning operation, the operation may end in block 528. The end of the positioning operation may be tied to the end of the scanning operation.

Figure 6:
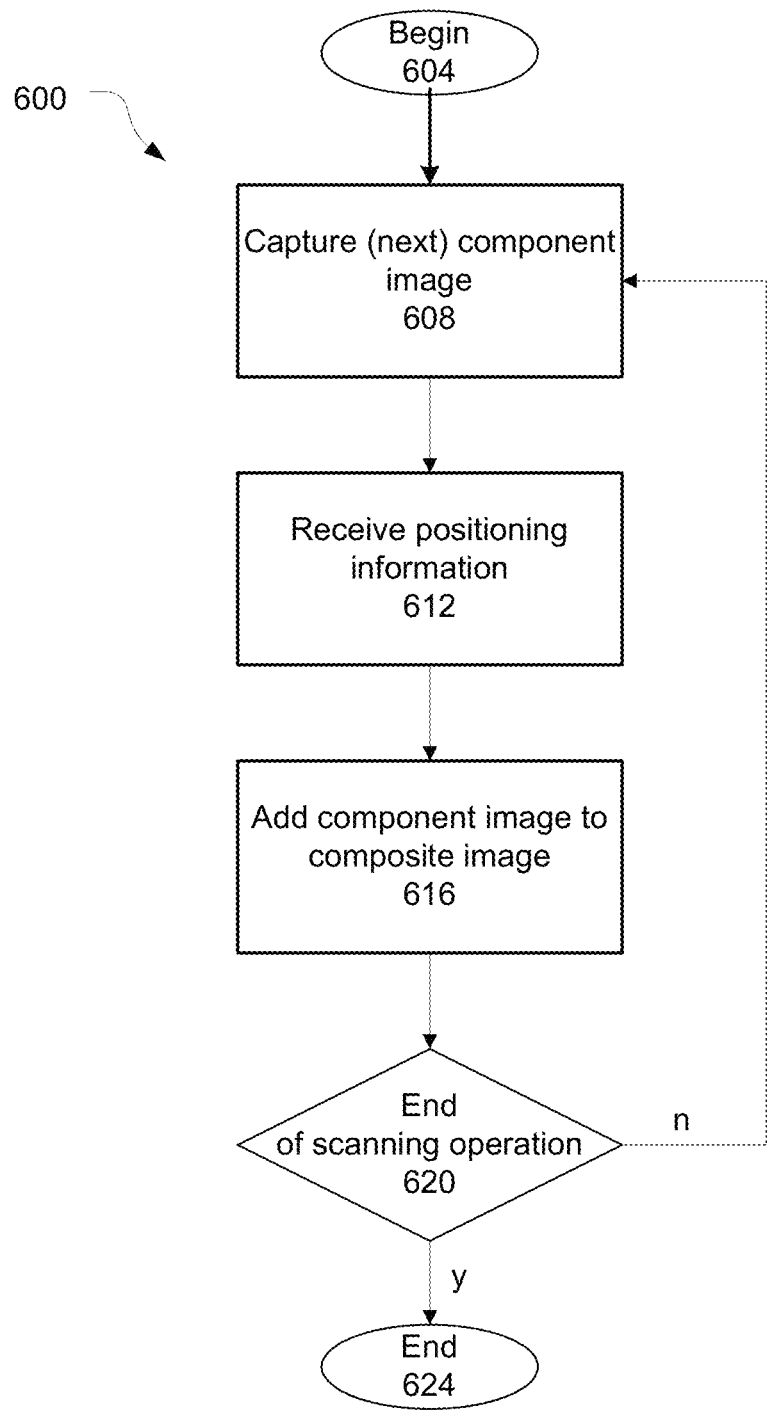
FIG. 6 is a flow diagram depicting a scanning operation of a scanning device in accordance with various embodiments of the present invention.

FIG. 6 is a flow diagram 600 depicting a scanning operation of a scanning device (such as 104 or 304, for example) or of a mobile telephone (such as 202, for example) in accordance with various embodiments of the present invention. The scanning operation may begin in block 604 with the receipt of a scan command generated from a user entering some input (by way of a user interface 128 or 228, for example).

The image capture module may control the optical imaging sensors to capture one or more component surface images in block 608. In some embodiments, the scan operation will only commence when the scanning device is placed on a medium to be scanned.

The image capture module may receive positioning information from the positioning module in block 612 and add the component images to the composite image in block 616. The image capture module may then determine if the scanning operation is complete in block 620.

The end of the scanning operation may be determined through a user manually cancelling the operation and/or through an automatic determination. In some embodiments, an automatic determination of the end of scan job may occur when all interior locations of a predefined image border have been scanned. The predefined image border may be determined by a user providing the dimensions of the image to be scanned or by tracing the border with the scanning device early in the scanning sequence.

If, in block 620, it is determined that the scanning operation has been completed, the scanning operation may conclude in block 624.

If, in block 620, it is determined that the scanning operation has not been completed, the scanning operation may loop back to block 608.

Figure 7:
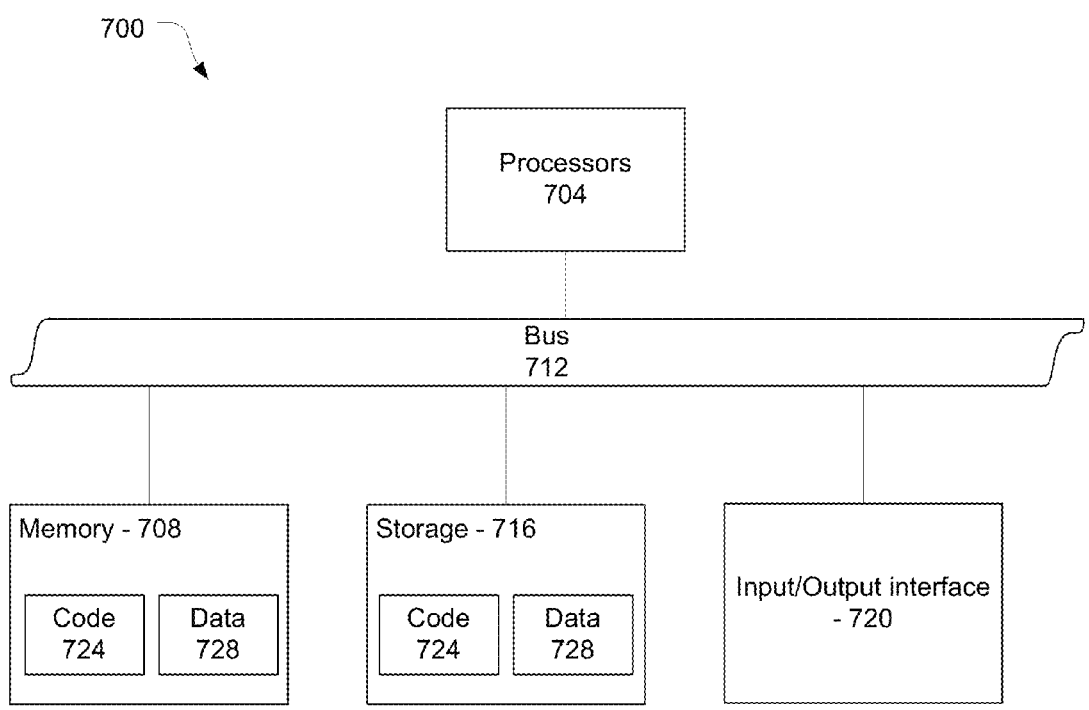
FIG. 7 illustrates a computing device capable of implementing a control block of a scanning device in accordance with various embodiments of the present invention.

FIG. 7 illustrates a computing device 700 capable of implementing a control block, e.g., control block 106 or 206, in accordance with various embodiments. As illustrated, for the embodiments, computing device 700 includes one or more processors 704, memory 708, and bus 712, coupled to each other as shown. Additionally, computing device 700 includes storage 716, and one or more input/output interfaces 720 coupled to each other, and the earlier described elements as shown. The components of the computing device 700 may be designed to provide the scanning and/or positioning functions of a control block of a scanning device as described herein.

Memory 708 and storage 716 may include, in particular, temporal and persistent copies of code 724 and data 728, respectively. The code 724 may include instructions that when accessed by the processors 704 result in the computing device 700 performing operations as described in conjunction with various modules of the control block in accordance with embodiments of this invention. The processing data 728 may include data to be acted upon by the instructions of the code 724. In particular, the accessing of the code 724 and data 728 by the processors 704 may facilitate scanning and/or positioning 704 may include one or more single-core processors, multiple-core processors, controllers, application-specific integrated circuits (ASICs), etc.

The memory 708 may include random access memory (RAM), dynamic RAM (DRAM), static RAM (SRAM), synchronous DRAM (SDRAM), dual-data rate RAM (DDRRAM), etc.

The storage 716 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. The storage 716 may be a storage resource physically part of the computing device 700 or it may be accessible by, but not necessarily a part of, the computing device 700. For example, the storage 716 may be accessed by the computing device 700 over a network.

The I/O interfaces 720 may include interfaces designed to communicate with peripheral hardware, e.g., a scanning device including one or more of navigation sensors, optical imaging sensors, etc., and/or other devices, e.g., a mobile telephone.

In various embodiments, computing device 700 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method comprising:
    controlling a navigation sensor to capture first navigational measurements of a first portion of a medium;
    controlling an optical image sensor to capture a first plurality of surface images of the first portion of the medium;
    based at least in part on the first navigational measurements, determining a position of a scanning device relative to a first reference point;
    based at least in part on the first plurality of surface images, correcting the determined position of the scanning device to generate a corrected position of the scanning device; and
    based at least in part on (i) the corrected position of the scanning device and (ii) the first plurality of surface images, constructing a composite image.

2. The method of claim 1, wherein correcting the determined position of the scanning device further comprises:
    processing the first navigational measurements of the first portion of the medium to generate one or more processed images;
    comparing (i) at least one of the processed images with (ii) at least one of the first plurality of surface images; and
    in response to the at least one of the processed images not matching with the at least one of the first plurality of surface images, correcting the determined position of the scanning device.

3. The method of claim 1, wherein constructing the composite image further comprises:
    based at least in part on the corrected position of the scanning device, constructing the composite image by stitching at least two of the first plurality of surface images.

4. The method of claim 1, further comprising transmitting the composite image to a mobile device.

5. The method of claim 1, further comprising processing the composite image in a manner to facilitate transmission of the composite image to a mobile device.

6. The method of claim 1, further comprising:
    controlling the navigation sensor to capture second navigational measurements of a second portion of the medium;
    determining a plurality of positions of the scanning device relative to a second reference point based at least in part on the second navigational measurements; and
    controlling the optical image sensor to capture a second plurality of surface images of the second portion of the medium,
    wherein the construction of the composite image is based at least in part on (i) the determined plurality of positions and (ii) the second plurality of surface images.

7. The method of claim 1, wherein the first navigational measurements comprises a first series of pictures of the first portion of the medium, and wherein determining the position of the scanning device relative to the first reference point further comprises:
    based at least in part on the first series of pictures of the first portion of the medium, detecting structural variations of the first portion of the medium; and
    based at least in part on detecting the structural variations of the first portion of the medium, determining the position of the scanning device relative to the first reference point.

8. The method of claim 1, further comprising:
    moving the scanning device over the first portion of the medium,
    wherein controlling the navigation sensor further comprises controlling the navigation sensor to capture the first navigational measurements while the scanning device is being moved over the first portion of the medium.

9. The method of claim 8, wherein controlling the optical image sensor further comprises controlling the optical image sensor to capture the first plurality of surface images while the scanning device is being moved over the first portion of the medium.

10. A scanning apparatus comprising:
    a navigation sensor configured to capture first navigational measurements of a first portion of a medium;
    an optical imaging sensor configured to capture a first plurality of surface images of the first portion of the medium; and
    a control block configured to
        based at least in part on the first navigational measurements, determine a position of the scanning apparatus relative to a first reference point, based at least in part on the first plurality of surface images, correct the determined position of the scanning device to generate a corrected position of the scanning device, and based at least in part on (i) the corrected position of the scanning device and (ii) the first plurality of surface images, construct a composite image.

11. The scanning apparatus of claim 10, wherein the control block is configured to correct the determined position of the scanning device by:

processing the first navigational measurements of the first portion of the medium to generate one or more processed images;

comparing (i) at least one of the processed images with (ii) at least one of the first plurality of surface images; and in response to the at least one of the processed images not matching with the at least one of the first plurality of surface images, correcting the determined position of the scanning device.

12. The scanning apparatus of claim 10, wherein the control block is configured to construct the composite image by:

stitching at least two of the first plurality of surface images, based at least in part on the corrected position of the scanning device.

13. The scanning apparatus of claim 10, wherein the control block is further configured to: control the navigation sensor to capture second navigational measurements of a second portion of the medium;

determine a plurality of positions of the scanning device relative to a second reference point based at least in part on the second navigational measurements; and control the optical image sensor to capture a second plurality of surface images of the second portion of the medium, wherein the construction of the composite image is based at least in part on (i) the determined plurality of positions and (ii) the second plurality of surface images.

14. The scanning apparatus of claim 10, wherein the first navigational measurements comprises a first series of pictures of the first portion of the medium, and wherein the control block is configured to determine the position of the scanning device relative to the first reference point by:

based at least in part on the first series of pictures of the first portion of the medium, detecting structural variations of the first portion of the medium; and based at least in part on detecting the structural variations of the first portion of the medium, determining the position of the scanning device relative to the first reference point.

15. The scanning apparatus of claim 10, wherein the control block is further configured to:

move the scanning device over the first portion of the medium, wherein the control block is configured to control the navigation sensor to capture the first navigational measurements while the scanning device is being moved over the first portion of the medium.

16. The scanning apparatus of claim 15, wherein the control block is configured to control the optical image sensor to capture the first plurality of surface images while the scanning device is being moved over the first portion of the medium.

17. The scanning apparatus of claim 10, further comprising:

a communication interface configured to transmit the composite image to a remote device.

18. The scanning apparatus of claim 17, wherein the communication interface is a wireless communication interface.

19. The scanning apparatus of claim 17, wherein the communication interface is configured to transmit the composite image to the remote device by a one of e-mail, fax, and file transfer protocol.

20. The scanning apparatus of claim 10, wherein the control block is further configured to process the composite image in a manner to facilitate transmission of the composite image to a remote device.

* * * * *